W. BROOKS.
Improvement in Cultivators.
No. 132,796.             Patented Nov. 5, 1872.
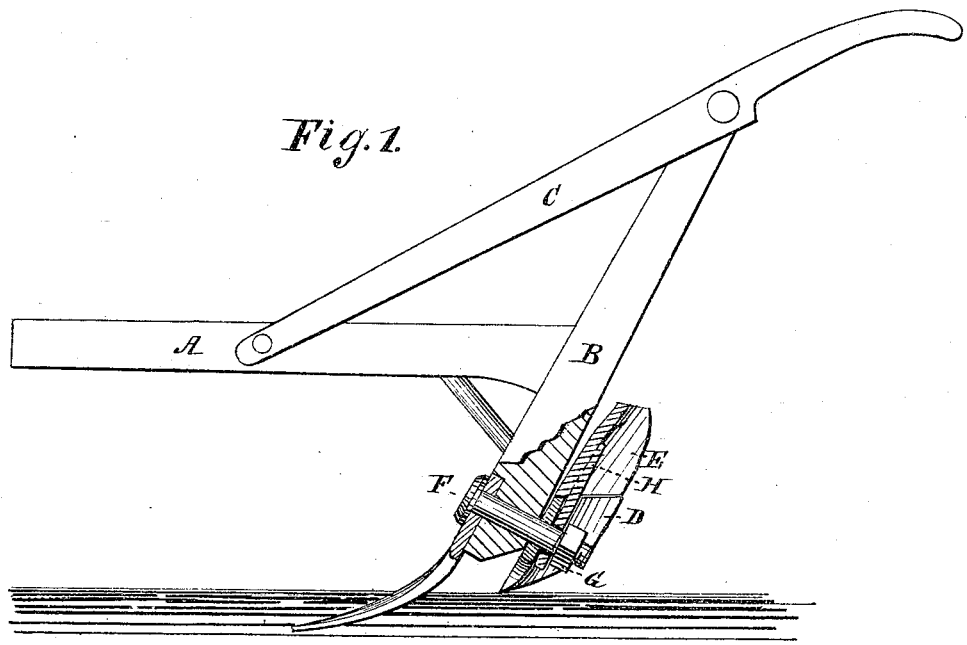
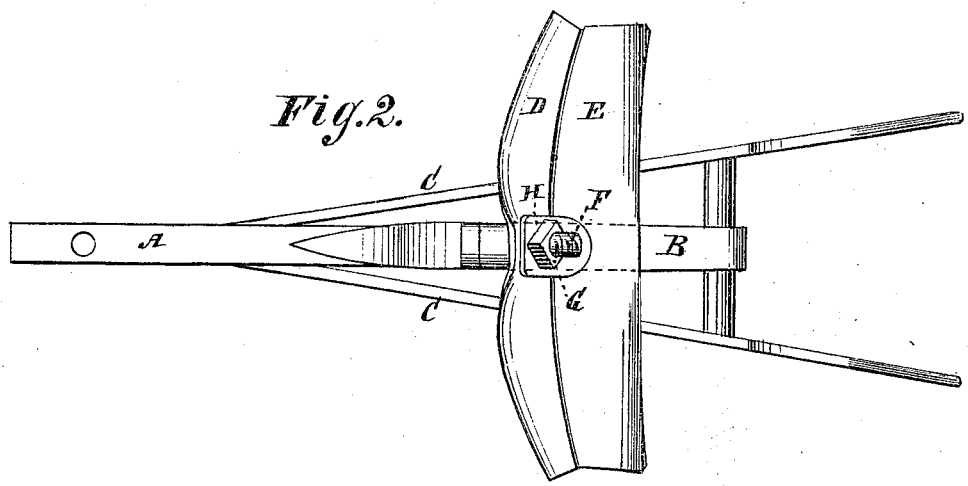
Witnesses:
G. Mathys.
C. A. Pettit
Inventor:
Wm Brooks
Per Munn & Co.
Attorneys.

UNITED STATES PATENT OFFICE.

WILLIAM BROOKS, OF LEXINGTON, GEORGIA.

IMPROVEMENT IN CULTIVATORS.

Specification forming part of Letters Patent No. 132,796, dated November 5, 1872.

*To all whom it may concern:*

Be it known that I, WILLIAM BROOKS, of Lexington, in the county of Oglethorpe and State of Georgia, have invented a new and useful Improvement in Cotton-Cultivators, of which the following is a specification:

This invention relates to means for cultivating cotton and other young crops, &c.; and it consists in the combination, with an ordinary single-shovel plow, of a pair of horizontal curved wings, which are attached to the heel of the shovel-standard by means of a single fulcrum-bolt, to enable said wings to adjust themselves to the surface of the ground, as will be hereinafter more fully described.

In the drawing, Figure 1 is a side elevation with parts broken out; Fig. 2 is a bottom view.

A, B, and C, respectively, represent the beam, shovel-standard, and handles of an ordinary shovel-plow. D and E are horizontal laterally-projecting curved wings, located in rear of the plow-standard and attached to the same through the medium of a screw-bolt, F, and nut G. H is a pendent flange or ear, formed on the rear face of the upper sectional wing E and provided with an opening for the passage of the screw-bolt F, thus enabling a single bolt to be used for attaching both wings to the standard. The nut G is applied to the bolt merely to prevent the wings from being detached from the same, and is therefore not tightened but turned only to a certain distance for allowing the free movement of the wings on said bolt, thus causing the same to adjust themselves to the inequalities of the ground. The lower sectional wing D is provided with a cutting-edge so as to more readily cut the weeds and pulverize the clods of earth thrown up by the shovel, and the same is in certain cases, when performing different kinds of work, used independently of the upper wing E, as said wing can be readily detached by simply removing the nut G. The upper wing E is used in conjunction with the lower one when it is desirable to throw the land up in beds or for throwing the earth to the young crop before it is large enough to bear the dirt from an ordinary mold-board plow.

Having thus described my invention, what I claim as new, and desire to secure by Letters Patent, is—

The combination, with an ordinary shovel-plow, A B C, of the sectional laterally-projecting curved wings D E, hung upon the fastening-bolt F, and adapted to be used in the manner set forth.

WILLIAM BROOKS.

Witnesses:
   GEO. F. PLATT,
   JOEL T. OLIVE.